United States Patent
Brambilla

[11] Patent Number: 6,056,304
[45] Date of Patent: May 2, 2000

[54] ELASTIC SUSPENSION FOR INDUSTRIAL VEHICLE AXLES AND THE LIKE

[75] Inventor: Alberto Brambilla, Rodengo Saiano, Italy

[73] Assignee: Clark-Hurth Components S.p.A., Arco, Italy

[21] Appl. No.: 08/978,862

[22] Filed: Nov. 28, 1997

[30] Foreign Application Priority Data

May 16, 1997 [IT] Italy .................................. MI97A1159

[51] Int. Cl.⁷ .............................. B60G 9/02; B60G 11/64
[52] U.S. Cl. .......................... 280/124.111; 280/124.112; 280/124.167; 180/358
[58] Field of Search ..................... 280/124.111, 124.112, 280/124.113, 124.149, 124.156, 124.158, 124.162, 124.167, 124.166, FOR 132, FOR 152, FOR 157, FOR 178; 180/358, 348; 267/277

[56] References Cited

U.S. PATENT DOCUMENTS

| | | | |
|---|---|---|---|
| 3,155,186 | 11/1964 | Cadmus et al. | 180/358 |
| 4,042,260 | 8/1977 | Youmans | 280/124.113 |
| 4,641,856 | 2/1987 | Reichenbach | 280/124.149 |

FOREIGN PATENT DOCUMENTS 6-48150  2/1994  Japan ............................ 280/FOR 178

*Primary Examiner*—Peter C. English
*Attorney, Agent, or Firm*—Guido Modiano; Albert Josif; Daniel O'Byrne

[57] ABSTRACT

An elastic suspension for axles of industrial vehicles, particularly axles of earth-movers, which is constituted by two substantially identical and superimposed metal plates; the upper plate is rigidly anchored to the chassis of the vehicle and the lower plate is connected to the conventional oscillating supports of the axle; the plates are mutually hinged along one side which is orientated longitudinally with respect to the vehicle so that they can move mutually apart and mutually closer by virtue of elastic elements which are capable of absorbing the maximum load that bears on the axle; the elastic elements are preferably constituted by a torsion bar which is keyed, with one of its ends, to the axis of the hinge and is rigidly coupled, with its opposite end, to the chassis of the vehicle by a transverse crank-shaped arm which is in turn connected to the stem of a cylinder that is capable of supplying the torque shaft with the necessary preloading for correct operation and of allowing the axle to be suspended or fixed with respect to the chassis by adjusting the stroke of the cylinder.

4 Claims, 1 Drawing Sheet

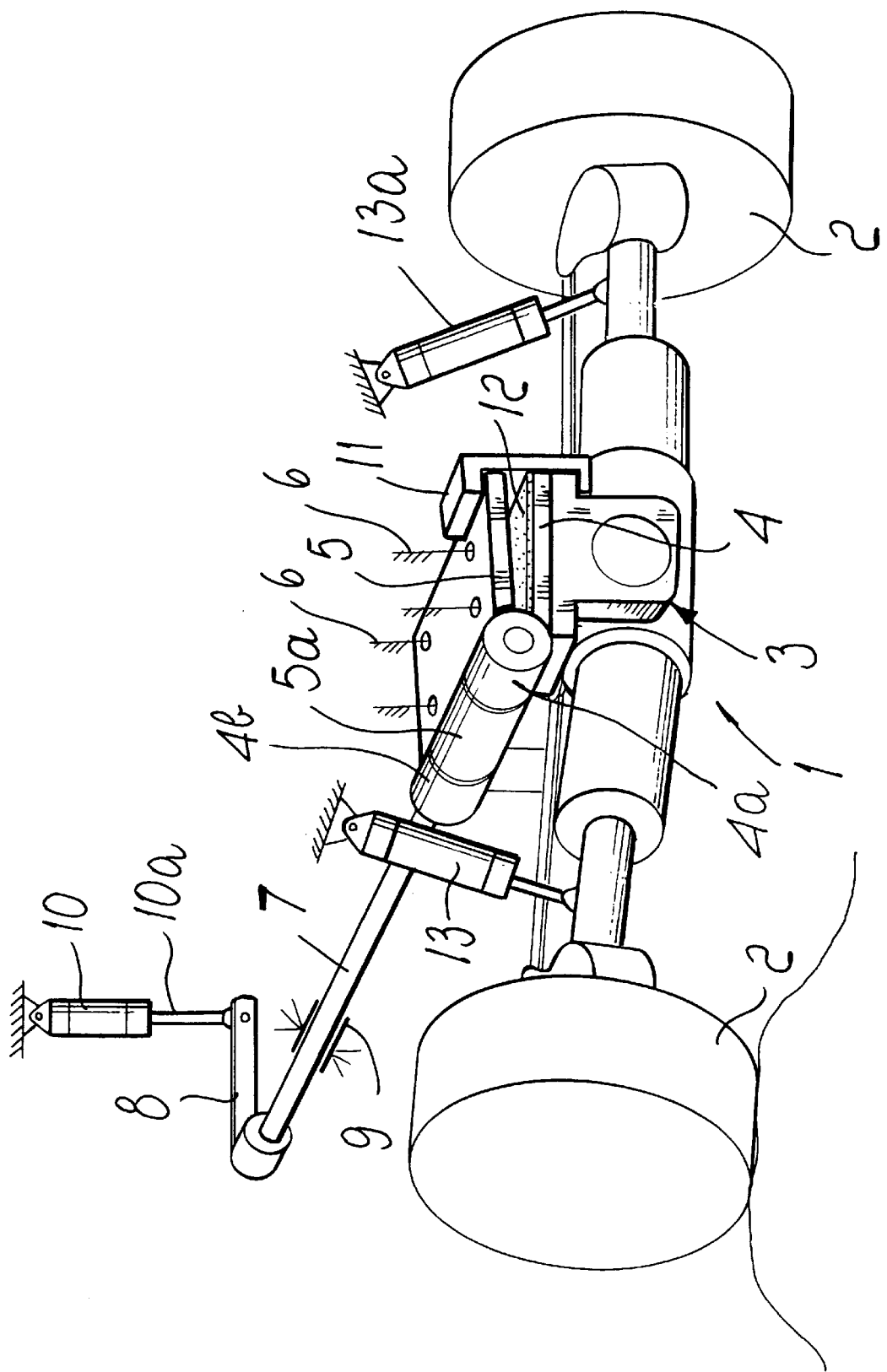

ELASTIC SUSPENSION FOR INDUSTRIAL VEHICLE AXLES AND THE LIKE

BACKGROUND OF THE INVENTION

The present invention relates to an elastic suspension for front and rear axles of industrial vehicles, particularly vehicles for earth-moving and for similar uses, such as excavators, lift trucks, tractors and the like.

Industrial vehicles with a maximum speed set to approximately 40 km/h conventionally rely on their tires to cushion impacts and vibrations during normal road travel and during use.

This is due to the fact that since at least one axle of these vehicles is not pivoting but is directly coupled to the chassis in a rigid manner, it directly transmits the loads that act on the chassis of the vehicle to the wheels through the axle (which are of the non-independent type); therefore, at the maximum allowed speeds the vehicles tend to bounce, negatively affecting driving safety.

It is also known that for example agricultural tractors have been recently equipped with electronically-controlled hydropneumatic suspensions for their front axles, indeed in order to stabilize the vehicle at the maximum allowed speed; likewise, again in the case of agricultural tractors and the like, it is substantially impossible to use conventional elastic suspensions, such as those constituted by leaf springs, which are arranged longitudinally with respect to the vehicle and connect the front axle to the chassis, owing to the limited front bulk of the agricultural tractor, which does not allow the leaf springs to protrude in front of the chassis, where there is often provided a fork, a loader or the like.

A system is also known which allows to provide a flexible suspension for axles of industrial vehicles, particularly of agricultural tractors, back hoe loaders and the like.

This elastic suspension is preset so that it can be applied to the steered axle of an all-terrain vehicle, for example an agricultural tractor; it is constituted by two axle portions or shanks which are coaxial to the axis of the front axle and to the axis of a torque shaft which is parallel to a first portion of the steering axle; said shanks are arranged at right angles to the axle and in front thereof (in the travel direction) and are mutually rigidly connected by a support or linkage which is parallel to the axle and acts by torque by s of a bridge-like cross-member connected to said torque shaft; to the rear of the bridge there is provided a second support which is parallel to the rear one and oscillates around the cardan shaft. One end of said oscillating support is connected to said portion of the steered axle, whilst the other end is rotatably connected to the end of the torque shaft. Said torque shaft is furthermore connected, through its free end, to the chassis of the vehicle. The axes of the steering shaft, of the cardan shaft and of the torque shaft are arranged on the same plane that contains the steered shaft.

This elastic suspension is structurally rather complicated and bulky, can be used only for the front axle of a tractor, and has no torque adjustment device or element.

SUMMARY OF THE INVENTION

Accordingly, the aim of the present invention is to provide an elastic suspension for axles of industrial vehicles, and particularly but not exclusively for axles of earth-movers, which is conceived and structured so as to obviate the drawbacks and shortcomings of the various conventional elastic suspensions and is most of all such as to not always require the use of any electronically-controlled pneumatic or hydraulic system or device.

Another object of the invention is to provide an elastic suspension for industrial axles which is structured so that it is very simple, compact and highly reliable.

Another object of the invention is to provide an elastic suspension of the above-specified type which is conceived so as to be applicable to both front and rear axles of industrial vehicles, according to the kind of work that the vehicle is meant to perform.

Another object of the invention is to provide said elastic suspension without requiring any particular treatment of current pivoting axles or additional costs.

Another object of the invention is to provide an elastic suspension for axles of industrial vehicles which is conceived and structured so as to allow the axle to be suspended or fixed with respect to the chassis of the vehicle, while allowing said bridge the necessary degree of freedom of oscillation about the axis of the cardan shaft, as occurs normally.

This aim, these objects and others which will become apparent from the description that follows are achieved by an elastic suspension for axles of industrial vehicles, particularly axles of earth-movers, agricultural tractors and the like, which uses elastically yielding means which are interposed directly between two plates, one plate being rigidly coupled to the pivoting axle support, the other plate being rigidly coupled to the chassis of the vehicle;

said suspension being constituted, according to the present invention, by two substantially identical and superimposed metal plates, the upper plate being rigidly anchored to the chassis of the vehicle, the lower plate being connected to the conventional oscillating supports of the axle, said plates being mutually hinged along a side which is directed longitudinally with respect to the vehicle so that they can move mutually apart and mutually closer by virtue of elastic means which are capable of absorbing the maximum load that bears on the axle, said elastic means being preferably constituted by a torsion bar which is keyed, with one of its ends, to the axis of said hinge and is rigidly coupled, with its opposite end, to the chassis of the vehicle by means of a transverse crank-shaped arm which is in turn connected to the stem of a cylinder capable of supplying the torque shaft with the necessary preloading for correct operation and of allowing the axle to be suspended or fixed with respect to the chassis by adjusting the stroke of said cylinder.

More particularly, mechanical means and elastic means are associated with said two plate elements; said mechanical means are suitable to limit the maximum opening of said plates and said elastic means are substantially made of rubber and are suitable to limit the minimum closure of said plates.

The suspended-axle condition is furthermore provided by the elasticity of said torsion bar.

Likewise, said elastic suspension can be applied to the front axle of agricultural tractors and similar vehicles, such as wheeled excavators, and it can be normally applied to the rear axle of lift trucks or wheel loaders, whilst it can be applied to both axles in the case of telescopic lift trucks with balancing cylinders.

BRIEF DESCRIPTION OF THE DRAWINGS

Further characteristics and advantages of the present invention will become apparent from the following detailed description given with reference to the accompanying drawing, which is provided only by way of non-limitative example and in which the only FIGURE is a perspective view of an elastic suspension executed according to the present invention and applied to a pivoting supported axle of an industrial vehicle, for example a lift truck or a wheeled excavator.

DESCRIPTION OF THE PREFERRED EMBODIMENTS

With reference to said FIGURE, the elastic suspension according to the present invention is substantially applied to a conventional pivoting axle, generally designated by the reference numeral 1 in the FIGURE, which is rigidly coupled in a conventional manner to two steered or fixed wheels 2; said axle oscillates on central supports, which are generally designated by the reference numeral 3 since they are of a conventional type.

The elastic suspension according to the present invention is constituted by a quadrangular plate 4, which is rigidly anchored to the top of the oscillating supports 3, and by a plate 5, which is rigidly anchored to the chassis of the vehicle (not shown in the FIGURE) by screws or other suitable means, which are shown schematically and designated by the reference numeral 6 in the FIGURE. Said plates 4 and 5 are mutually superimposed and kept at a short distance from each other and are mutually connected by hinge means constituted by eyelets 4a–4b which are coaxial and rigidly coupled to one side of the lower plate 4 and by an eyelet 5a which is rigidly coupled to the corresponding side of the upper plate 5. The end of a cylindrical shaft 7 is fitted on the pivoting axis of the two plates; said end is rigidly anchored inside the eyelets 4a and 4b, which are rigidly coupled to the lower movable plate 4, but can rotate freely within the central eyelet 5a of the upper fixed plate 5. In this manner, the shaft 7 can act as a torque shaft if its opposite end is anchored to the chassis.

The free end of the shaft 7 is in fact connected to the chassis by an element 8 which acts as a crank and is used to torsionally preload the shaft 7 according to the weight of the chassis and of the load supported by it; for this purpose, the torque shaft 7 is freely guided within one or more bushes or sleeves 9 rigidly coupled to the chassis and is arranged substantially in the direction of the longitudinal axis of the vehicle. The preloading of the crank 8 is provided by means of a cylinder 10, which is oscillatably connected to the chassis of the vehicle; the stem 10a of said cylinder is also oscillatably connected to the underlying crank 8, so that by actuating said cylinder 10 it is possible to preload the crank 8, and therefore the torque shaft 7, so as to ensure, as mentioned, correct operation of the elastic suspension.

Moreover, an element 11 is associated with said plates 4 and 5 and is substantially constituted by one or more plates which are folded in a U-like shape and rigidly coupled to the upper plate 5 and accordingly to the chassis; said plates are located and sized so as to accommodate, between their opposite wings, the free ends of the two plates in their maximum spacing position, in order to constitute a reliable device for stopping the opening of the two plates; likewise, there is provided an element 12, substantially a layer of rubber, which is interposed between said plates 4 and 5 and is suitable to limit the impact of said plates during closure.

It is also possible to provide rubber bushings (so-called "silentblocs") between the chassis and the lower plate 4 or also hydraulic shock-absorbers, which are suitable to damp the vibrations induced during the travel of the vehicle.

Also according to the invention, the elastic suspension described above and shown in the accompanying FIGURE provides first of all the advantage that it makes the axle kinematically free, within certain limits, in a vertical direction and rotationally about its own axis, at the same time keeping it rigidly coupled to the chassis without being able to oscillate in other directions, and furthermore offers the option of vertically suspending or fixing said axle with respect to the chassis, while leaving said axle the normal degree of freedom to oscillate, as in conventional systems, about the axis of the cardan shaft.

Said fixed or suspended axle positions are obtained by means of two different strokes of the stem 10a of said cylinder 10; through the retraction of the cylinder, the two plates 4 and 5 are in fact stably moved into the stable closure position, so that the axle 1 remains rigidly coupled to the chassis, whilst by actuating the cylinder by means of the protrusion of the stem the plates are moved into the open position and the condition in which the axle 1 is suspended with respect to the chassis is thus obtained, this condition being allowed by the elasticity of the torsion bar 7. Moreover, in the case of vehicles which have the ordinary two hydropneumatic cylinders 13-13a interposed between the front axle and the chassis (for example wheeled excavators and telescopic lift trucks with two oscillating axles), it is possible to use said two cylinders, by means of controls provided in the driver's cabin of the vehicle, as hydropneumatic cylinders for controlling and stabilizing the axles with respect to the chassis so as to obtain a true and more effective suspension.

Finally, in practice the present elastic suspension can be used normally on the front axle in the case of tractors and similar vehicles, whilst it can be applied to the rear axle in the case of lift trucks and wheel loaders; in the specific case of lift trucks with telescopic arms and of excavators, which use two hydraulic cylinders meant to lock the oscillation of the axle during work, the present elastic suspension can be installed on the front axle.

Thus, in the suspension according to the invention, the vehicle ground clearance is maintained constant when the axle is suspended from the chassis by varying the hydraulic pressure of said cylinder actuating the travel of said crank and therefore preloading the torsion bar according to the load on the axle through an hydraulic valve feed-back that is measuring the axle centre to chassis distance.

Also in the suspension according to the invention instead of the two shock absorbers, two ordinary hydropneumatic cylinders are interposed between the axle and the chassis; these two new cylinders will work together with the said cylinder actuating said crank for controlling the ground clearance, but alone for stabilising the vehicle controlling the axle angle to the chassis, through an electronic hydropneumatic control provided from the vehicle driver's cabin, whereby said system provides a true and effective hydropneumatic suspension.

In practical execution, the invention as described and illustrated is of course susceptible of structurally and functionally equivalent modifications and variations without abandoning the scope of the protection of said invention.

What is claimed is:

1. An elastic suspension for an axle of an industrial vehicle having elastically yielding means interposed directly between the axle and a chassis of the vehicle, comprising; two substantially identical and superimposed metal plates, the upper one of said plates being rigidly anchored to the chassis of the vehicle, and the lower one of said plates being connected to oscillating supports of the axle, said plates having a side thereof which is directed longitudinally with respect to the vehicle; hinge means provided at said side for hinging along an axis of said hinge means such that said plates are movable mutually apart and respectively mutually closer; elastic means which are capable of absorbing a maximum load that bears on the axle, said elastic means comprising a torsion bar, said torsion bar being keyed, with a first end thereof, to said hinge means and further rigidly coupled, with a second opposite end thereof, to the chassis of the vehicle; a adverse crank arm for connecting said second end of the torsion bar to the chassis; and a cylinder with a stem thereof connected to said crank arm, wherein said stem has a vertical axis and supplies the torsion bar with a necessary preloading for correct operation while allowing the axle, by adjusting a stroke of said cylinder, to be in any of a suspended or fixed condition with respect to the chassis.

2. The elastic suspension according to claim 1, comprising mechanical means, for limiting a maximum opening of said plates; and elastic means interposed between the two plates fibr limiting a minimum closure of said plates, said mechanical means and said elastic means between said plates being associated with said two plates, and wherein said elastic means between said plates are constituted by rubber layer elements.

3. The suspension according to claim 1, wherein said suspended axle condition is provided by the elasticity of said torsion bar, whereby said crank arm being actuated by said cylinder preloading said torsion bar, with said plates being positionable between a maximum and a minimum allowed position.

4. The supension according to claim 1, wherein said fixed axle condition is provided when the plates are stably moved closer, between the axle and the chassis, said condition being kept stable by said torsion bar which is preloaded by said crank arm actuated by said cylinder.

* * * * *